July 26, 1927.

G. A. SHOEMAKER

BEARING

Filed Sept. 27, 1921

1,637,317

Inventor
George A. Shoemaker
By his Attorney
C. H. Barker

Patented July 26, 1927.

1,637,317

UNITED STATES PATENT OFFICE.

GEORGE A. SHOEMAKER, OF PHILADELPHIA, PENNSYLVANIA, ASSIGNOR TO BOUND BROOK OIL-LESS BEARING COMPANY, A CORPORATION OF NEW JERSEY.

BEARING.

Application filed September 27, 1921. Serial No. 503,474.

The invention relates to bearings and is particularly directed to a composite type of bearing, and although not of the so called oil-less type, is of a character which will stand up with comparatively little oil.

The object of the invention is to provide a composite bearing with the elements so arranged that there will always be a partial bearing surface of the main bearing metal or metal of the casing together with an ample bearing surface upon the alloy metal.

Composite bearings of bronze and graphite in various forms of arrangement are not new in the art and, of course, these fall within the general type of oil-less bearings.

It has been a common practice to cast bronze shells with indentations, pockets or grooves therein, which indentations, pockets or grooves have been filled with graphite compound. It has also been a common practice to make bearings of bronze having a complete interior lining of Babbitt metal or other so called greasy metal.

In crankshafts for motors and in various places this latter type of bearing has come into almost universal use inasmuch as the Babbitt lining serves as an unusually good bearing surface, may be readily scraped to exact fit and in the event of overheating, thru lack of lubrication, will not freeze to the shaft. In fact, when over heated to the critical point, the Babbitt metal will run out.

One of the purposes of the present invention is to provide a bearing of an intermediate type from the two distinct forms above enumerated and to arrange for a Babbitt or other bearing metal surfacing within the main bronze shell or casing.

To effect the best results, a bearing alloy may be employed, as hereinafter defined, the co-efficient of expansion of which may be practically coincident with the co-efficient of expansion of the bronze shell or casing.

Referring to the drawings.

Figure 1:
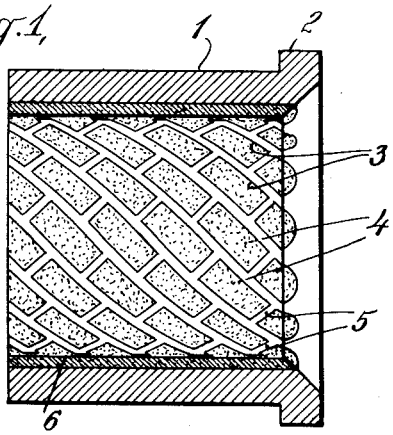
Figure 1, illustrates in plan, one half of the bearing.

The exact form and arrangement of the pockets or retaining depressions for the Babbitt or other similar bearing metal is a matter which may be determined for the particular use to which the bearing is to be put. The pockets may be in spiral form running from end to end of the bronze or brass shell. They may be in the form of isolated pockets staggered with reference to each other. Reverse spiral grooves may be utilized, and in fact, any of the known arrangements of grooves or pockets heretofore successfully used in graphite bronze structures may be employed if desired. The angularity of the grooves or pockets as they extend about the interior of the shell may be varied to suit the exigencies of any particular requirement.

There is illustrated in the drawings, a type of pocket and arrangement thereof which has been found to be particularly efficacious on crankshafts.

Figure 2:
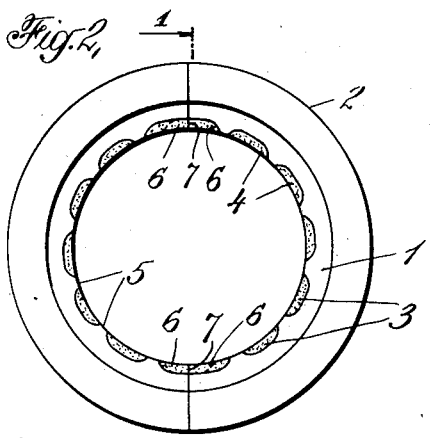
Figure 2, is an end view of the complete bearing.
Figure 4:
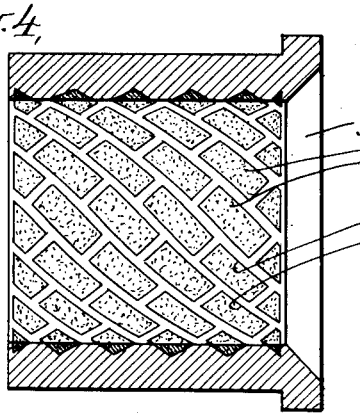
Figure 4, illustrates a slightly modified form of containing pocket.
Figure 3:
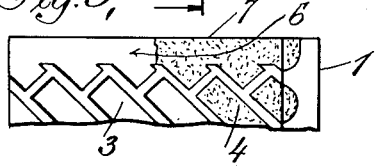
Figure 3, is a fragmentary view showing the meeting edge of the complete bearing.

In the accompanying drawings, Figures 1 to 3, inclusive, there is illustrated a bronze bearing shell 1, having the usual flange 2. This shell is cast in two halves with the grooves providing pockets 3, which, as illustrated, extend in spiral lines transversely of the axis of the bearing thus providing intermediate webs of bronze 4.

The pockets 3, are not continuous but are broken as to their length forming comparatively short pockets, the alternate rows of which are staggered with reference to each other so that there are intermediate bodies of bronze as at 5.

At the adjacent meeting edges of the two sections of the bearing there is a continuous groove 6, as illustrated in Figures 2 and 3, and the pockets at the edges merge into this groove 6. The groove 6, extends from end to end of the bearing and thus gives a continuous body of babbitt along the meeting edges of the two halves of the bearing, and extending parallel with the axis.

There is a certain advantage in providing this continuous strip of babbitt at the edges of the two halves of the bearing, inasmuch as it gives a free working material which may be readily scraped to bring the bearing up to place on the shaft.

This composite bearing may be bored with great accuracy inasmuch as the bronze will give the proper support for the boring tool and will permit accurate cutting of the babbitt. It follows that bearings of this type may be made within very close tolerance and it only remains to scrape the edges along the longitudinal babbitt 7, to insure a perfect adjustment of the bearing on the shaft.

Figure 5:
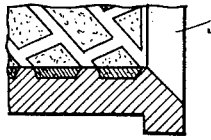
Figure 5, is a fragmentary view illustrating the pockets terminating entirely within the length of the shell.
Figure 6:
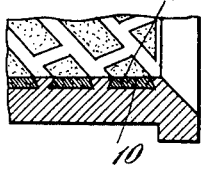
Figure 6, illustrates an undercut form of pocket.

In Figures 1 to 3 inclusive, the pocket 3 are extended to the extreme end of the metal shell while in Figures 5 and 6, the pockets terminate within the end of the shell. These are mere matters of preference and in any form there is a substantial bronze bearing surface in contact with the shaft with the intermediate pockets of Babbitt or other bearing metal. The weight of the shaft, is, of course, sustained both by the babbitt and bronze webs or fins which exist between pockets or grooves. It will be readily seen that with a lack of lubrication and a heating up of the bearing, the Babbitt or soft bearing metal cannot readily run or flow out of the shell. At any rate, it cannot flow sufficiently to drop the shaft out of line, as the shaft will be maintained on the bronze webs or fins which form a part of the bearing surface.

In use, the babbitt is worn slightly and covers the entire elemental line surface of the bearing so that there is no tendency for the shaft to freeze. Such bearings as these are of great service in engines and motors where ordinarily there is ample lubrication provided but where occasionally the lubricant runs low, or becomes thin or ceases to function.

There is really so little bronze in contact with the shaft that there is practically no tendency of freezing and yet should the bearing become overheated even to the point of "running" the babbitt, the shaft will be held in proper alignment. The advantages of this are at once apparent.

In Figure 5, the same general type of pocket and bronze shell is employed as that illustrated in Figs. 1 to 3, inclusive, but the pockets 8, terminate within the end 9, of the metal shell whereas, in Fig. 1, the pockets 3 extend through the end wall.

In certain cases there is the advantage in stopping the pockets within the bronze shell giving a complete elemental and circumferential line of bronze at each end of the bearing. It prevents "running" and "dropping" of the babbitt into the crank cases.

In Figure 6, an undercut form of pocket is illustrated wherein the base 10, of the grooves or pockets is wider than the bearing surface 11. This, of course, provides an interlocking of the two metals so that in the event of a difference in the co-efficient of expansion and contraction, the babbitt cannot be loosened to such an extent as to drop away from the shell.

Figure 7:
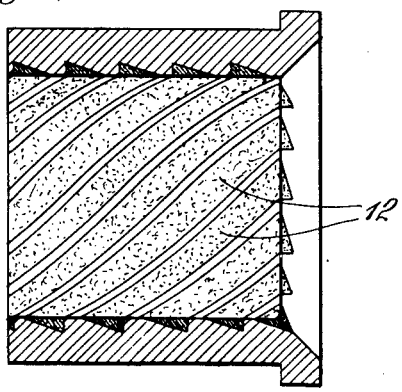
Figure 7, illustrates the pockets in the form of spiral grooves.
Figure 8:
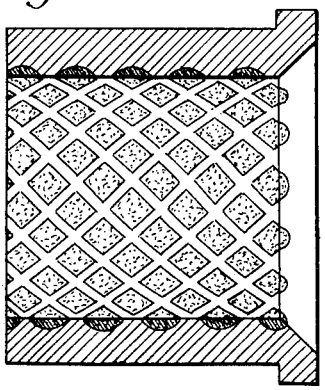
Fig. 8 illustrates a modified form of the containing pocket.

In Figure 7, there is illustrated a continuous form of groove 12. It will be noted that in any of the various forms the position of the pockets is such that every elemental line of the shaft will rest upon and pass over the Babbitt or soft bearing metal during rotation of the shaft, so that there is really a continuous Babbitt bearing surface while the shaft is rotating.

As hereinabove stated, the soft anti-friction metal which fills the cavities of the shell, and the metal of the shell have substantially the same coefficient of expansion. I have used compositions of bronze for the shell composed of a mixture of copper, tin and lead, with the proportion of copper about 88%; also a mixture of copper, tin, lead and zinc, with the copper forming about 85% of the same. For the soft anti-friction metal, I have used a mixture of lead, tin and antimony, with the proportion of lead about 75%; I have also used a soft-metal mixture of tin, antimony and copper, with the proportion of tin about 80%. These mixtures are such that the coefficient of expansion of the bronze used, is substantially that of the soft-metal used therewith in the composite bearing.

The method of producing these bearings is important and so far as known to applicant, is new in the art.

The bronze shells are first cast with the pockets of any desired form cored out. These shells, with the cored out pockets, are then "tinned" to provide the most intimate contact for the Babbitt or soft metal.

The Babbitt or soft metal is then cast into the tinned pockets and shell giving an absolute union of the metals. The shells, with their cast in Babbitt or soft metal are then bored to size and finish. It follows, that there is a finished structure of homogeneous character quite different from the ordinary babbitted bearing.

As heretofore stated, the exact form and shape of the grooves or pockets and their disposition with reference to each other may be varied to suit the exigencies of any particular requirement depending upon whether the bearing is used for high duty, high speed or for light duty or low speed. Variations may be made between bearings such as are to be used on shafts having complete revolutions and those employed on shafts having oscillatory movement.

What I claim as my invention and desire to secure by Letters Patent is:

In a bearing comprising a metallic shell divided longitudinally into separable sections having interior bearing webs or fins and pockets intermediate the webs or fins, continuous marginal pockets at the meeting edges of the bearing sections extending longitudinally thereof, and communicating with the aforesaid pockets and an alloy bearing metal cast into said pockets flush with the bearing surfaces of said webs or fins.

GEO. A. SHOEMAKER.